US011985188B2

(12) United States Patent
Shetty

(10) Patent No.: US 11,985,188 B2
(45) Date of Patent: May 14, 2024

(54) DECENTRALIZED NETWORK TOPOLOGY ADAPTATION IN PEER-TO-PEER (P2P) NETWORKS

(71) Applicant: VMware, INC., Palo Alto, CA (US)

(72) Inventor: Vamshik Shetty, Karnataka (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/741,408

(22) Filed: May 10, 2022

(65) Prior Publication Data

US 2023/0370520 A1    Nov. 16, 2023

(51) Int. Cl.
*H04L 67/1042* (2022.01)
*H04L 41/0816* (2022.01)
*H04L 41/0823* (2022.01)
*H04L 41/12* (2022.01)
*H04L 41/16* (2022.01)

(52) U.S. Cl.
CPC ...... *H04L 67/1042* (2013.01); *H04L 41/0816* (2013.01); *H04L 41/0836* (2013.01); *H04L 41/12* (2013.01); *H04L 41/16* (2013.01)

(58) Field of Classification Search
CPC ............. H04L 67/1042; H04L 41/0816; H04L 41/0836; H04L 41/12; H04L 41/16
See application file for complete search history.

(56) References Cited

U.S. PATENT DOCUMENTS

| 2004/0165536 | A1* | 8/2004 | Xu | H04L 67/104 |
| | | | | 370/252 |
| 2016/0191325 | A1* | 6/2016 | Pacella | H04L 45/20 |
| | | | | 370/254 |
| 2018/0274943 | A1* | 9/2018 | Stöcker | G06Q 40/04 |
| 2019/0044824 | A1* | 2/2019 | Yadav | H04L 43/04 |
| 2019/0312810 | A1* | 10/2019 | Strom | H04L 67/104 |

(Continued)

OTHER PUBLICATIONS

Feature Vector, Brilliant.org, Wayback Machine snapshot on Nov. 2, 2018, https://web.archive.org/web/20181102162523/https://brilliant.org/wiki/feature-vector/.*

(Continued)

*Primary Examiner* — Glenton B Burgess
*Assistant Examiner* — Gregory P Tolchinsky
(74) *Attorney, Agent, or Firm* — King Intellectual Asset Management

(57) ABSTRACT

Example methods and systems for decentralized network topology adaptation in a in a peer-to-peer (P2P) network are described. In one example, a first computer system may obtain first attribute information associated with the first computer system; and second attribute information associated with a second computer system. Based on the first and second attribute information, the first computer system may generate a connection confidence prediction associated with a connection between the first computer system and the second computer system. The connection confidence prediction may indicate whether the connection is a suboptimal connection associated with a suboptimal network topology. In response to determination that the connection confidence prediction satisfies a break condition, the first computer system may break the connection between the first computer system and the second computer system, but otherwise maintain the connection.

21 Claims, 8 Drawing Sheets

(56) References Cited

U.S. PATENT DOCUMENTS

| | | | |
|---|---|---|---|
| 2020/0125960 A1* | 4/2020 | Javaheripi | G06N 3/10 |
| 2020/0167309 A1* | 5/2020 | Nicol | G06F 15/7867 |
| 2022/0053052 A1* | 2/2022 | Motylinski | H04L 67/1042 |
| 2022/0104310 A1* | 3/2022 | Hu | H04W 84/18 |
| 2022/0303331 A1* | 9/2022 | Svennebring | H04N 21/8456 |

OTHER PUBLICATIONS

Matei Ripeanu, "Peer-to-Peer Architecture Case Study: Gnutella Network", IEEE Xplore, 2002.

Ion Stoica et al., "Chord: A Scalable Peer-to-peer Lookup Service for Internet Applications", SIGCOMM'01, Aug. 27-31, 2001, pp. 149-160, vol. 31, No. 4.

Ben Y. Zhao et al., "Tapestry: A Resilient Global-Scale Overlay for Service Deployment", IEEE Journal on Selected Areas in Communications, Jan. 2004, pp. 41-53, vol. 22, No. 1.

Mohamed Elsharnouby, "Search Techniques in Peer to Peer Networks", 2017.

Robert Beverly et al., "Machine Learning for Efficient Neighbor Selection in Unstructured P2P Networks", 2007, Retrieved from <URL: https://www.usenix.org/legacy/events/sysml07/tech/full_papers/beverly/beverly.pdf> on May 5, 2022.

Hongbo Liu et al., "Neighbor Selection in Peer-to-Peer Overlay Networks: A Swarm Intelligence Approach", 2009, Retrieved from <URL: https://www.researchgate.net/publication/225237388_Neighbor_Selection_in_Peer-to-Peer_Overlay_Networks_A_Swarm_Intelligence_Approach> on May 5, 2022.

Yifan Mao et al., "Perigee: Efficient Peer-to-Peer Network Design for Blockchains", PODC '20, Aug. 3-7, 2020.

Aleksandrs Slivkins, "Introduction to Multi-Armed Bandits", Published with Foundations and Trendsr in Machine Learning, Nov. 2019.

Gopal Pandurangan et al., "Building Low-Diameter Peer-to-Peer Networks", IEEE Journal on Selected Areas in Communications, Aug. 2003, pp. 995-1002, vol. 21, No. 6.

Joseph A. Francoeur et al., "A Protocol Implementation for Low Diameter Peer-to-Peer Networks", Conference Paper, Jan. 2005.

F. Rosenblatt, "The Perceptron: A Probabilistic Model for Information Storage and Organization in the Brain", Psychological Review, 1958, pp. 386-408, vol. 65, No. 6.

Aditya Grover et al., "node2vec: Scalable Feature Learning for Networks", KDD '16, Aug. 13-17, 2016.

Leonardo F. R. Ribeiro et al., "struc2vec: Learning Node Representations from Structural Identity", KDD '17, Aug. 13-17, 2017.

Petar Maymounkov et al., "Kademlia: A Peer-to-Peer Information System Based on the XOR Metric", 2017, Retrieved from <URL: https://www.researchgate.net/publication/2492563_Kademlia_A_Peer-to-peer_Information_System_Based_on_the_XOR_Metric> on May 5, 2022.

Rupesh Gunturu, "Survey of Sybil Attacks in Social Networks", Retrieved from <URL: https://arxiv.org/pdf/1504.05522.pdf> on May 5, 2022.

\* cited by examiner

Number of hops from NODE 1 to NODE 15 = 11 ~ 630
(Suboptimal network topology with substantially large network diameter)

~ Network topology adaptation 640

Number of hops from NODE 1 to NODE 15 = 3 ~ 670
(Contracted network topology with reduced network diameter)

| K | D | CBT | CAT | CBT% | CAT% | MCBT | MCAT | MCC |
|---|---|---|---|---|---|---|---|---|
| 3 | 7 | 41 | 17 | 0.706 | 0.293 | 0.750 | 0.854 | 0.781 |
| 4 | 5 | 64 | 14 | 0.820 | 0.179 | 0.626 | 0.863 | 0.669 |
| 5 | 4 | 79 | 17 | 0.822 | 0.177 | 0.617 | 0.868 | 0.662 |
| 6 | 4 | 88 | 22 | 0.8 | 0.2 | 0.575 | 0.872 | 0.634 |
| 7 | 4 | 111 | 15 | 0.880 | 0.119 | 0.529 | 0.871 | 0.569 |
| 8 | 3 | 121 | 25 | 0.828 | 0.171 | 0.499 | 0.902 | 0.568 |
| 9 | 3 | 138 | 25 | 0.846 | 0.153 | 0.464 | 0.888 | 0.529 |
| 10 | 3 | 143 | 35 | 0.803 | 0.196 | 0.434 | 0.886 | 0.523 |

| K | D | CBT | CAT | CBT% | CAT% | MCBT | MCAT | MCC |
|---|---|---|---|---|---|---|---|---|
| 5 | 5 | 290 | 4 | 0.986 | 0.013 | 0.485 | 0.833 | 0.489 |
| 6 | 5 | 339 | 6 | 0.982 | 0.017 | 0.431 | 0.834 | 0.438 |
| 7 | 4 | 398 | 6 | 0.985 | 0.014 | 0.398 | 0.834 | 0.404 |
| 8 | 4 | 454 | 8 | 0.982 | 0.017 | 0.285 | 0.859 | 0.295 |
| 9 | 4 | 505 | 11 | 0.978 | 0.021 | 0.241 | 0.843 | 0.254 |
| 10 | 4 | 560 | 22 | 0.962 | 0.037 | 0.210 | 0.863 | 0.235 |

DECENTRALIZED NETWORK TOPOLOGY ADAPTATION IN PEER-TO-PEER (P2P) NETWORKS

BACKGROUND

In a peer-to-peer (P2P) network, nodes may offer a variety of services, resources, or compute power. Nodes in the P2P network may be used to perform various tasks, such as sharing files, maintaining a consensus over a conflict-free replicated data type (CRDT) that involves replicating data structure(s) across multiple nodes, etc. Such tasks rely on source node(s) generating and spreading data towards the farthest node(s) in the P2P network in an efficient manner. As such, a suboptimal network topology (e.g., one having a substantially large network diameter) has the undesirable effect of incurring a higher latency associated with the spread of data. This is also inefficient and affects the performance of nodes in the P2P network.

DETAILED DESCRIPTION

Figure 1:
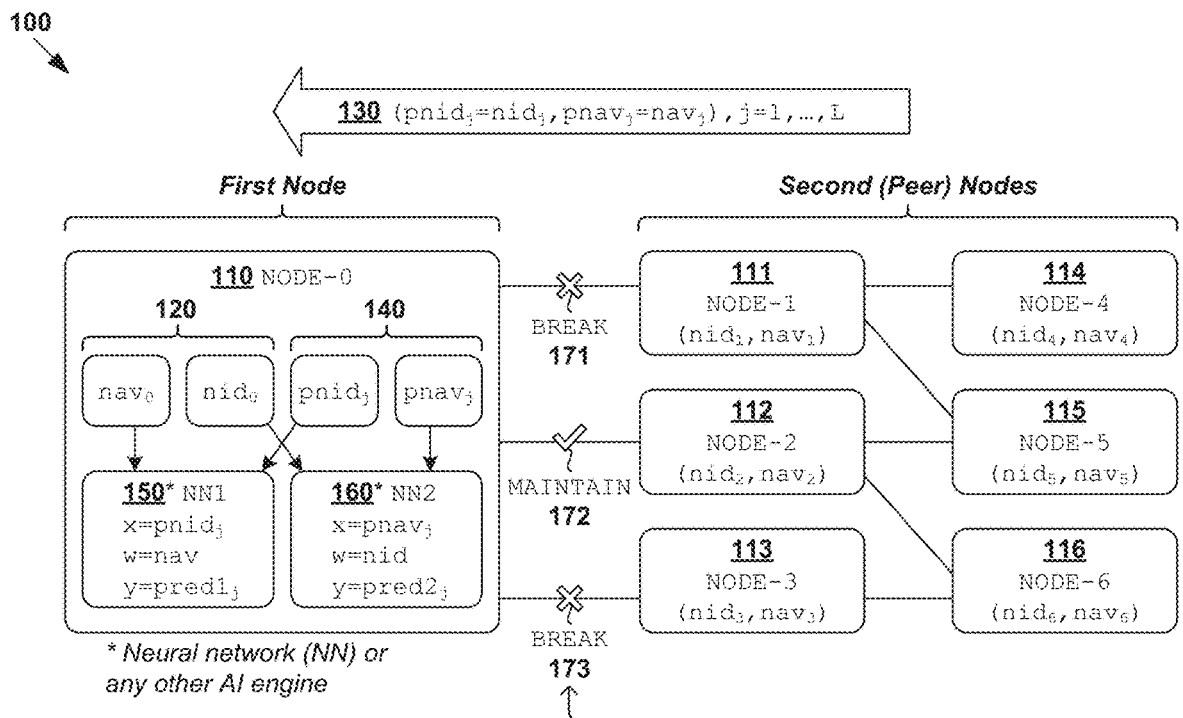
FIG. 1 is a schematic diagram illustrating an example peer-to-peer (P2P) network in which decentralized network topology adaptation may be performed.

According to examples of the present disclosure, decentralized network topology adaptation may be implemented in a peer-to-peer (P2P) network. One example may involve a first computer system (e.g., first node=NODE-0 110 in FIG. 1) may obtain first attribute information associated with the first computer system; and second attribute information associated with a second computer system (e.g., second node=NODE-1 111 or NODE-2 112 in FIG. 1). Based on the first attribute information and the second attribute information (see 120-140 in FIG. 1), the first computer system may generate a connection confidence prediction associated with a connection between the first computer system and the second computer system.

The connection confidence prediction may indicate whether the connection is a suboptimal connection associated with a suboptimal network topology. In one example, the connection confidence prediction may be associated with a connection strength of the connection between the first computer system and the second computer system. The first computer system may determine whether the connection confidence prediction satisfies a break condition that is configured to detect the suboptimal connection. In response to determination that the connection confidence prediction satisfies a break condition, the first computer system may break the connection between the first computer system and the second computer system (see 171 in FIG. 1). Otherwise, the first computer system may maintain the connection (see 172 in FIG. 1). Various examples will be discussed below using FIGS. 1-8.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

Example P2P network

The popularity of P2P networks has been increasing for the last decade due to, inter alia, the popularity of the field of blockchain. P2P network represents a set of self-organizing nodes on an overlay network built over the Internet Protocol (IP). The overlay network, which sits above an underlying physical network, may be used to search for resources and nodes, and to route messages among nodes. Depending on the desired implementation, P2P networks may be formed when a set of self-sufficient nodes need to execute function(s) independent of a central authority to supervise the execution of said function(s). This has resulted in a variety of use cases in decentralized settings, such as file sharing, distributed storage, basis of blockchain applications, etc.

In more detail, FIG. 1 is a schematic diagram illustrating example P2P network 100 in which decentralized network topology adaptation may be performed. In this example, an overlay network of P2P network 100 may be represented using a graph whose vertices are the nodes, and edges are connections among the nodes. It should be understood that, depending on the desired implementation, P2P network 100 may include additional and/or alternative component(s) than that shown in FIG. 1. Here, P2P network 100 may be formed using multiple computer systems known as nodes. This includes a "first computer system" in the form of a first node (e.g., NODE-0 110), and multiple (L) "second computer systems" in the form of second nodes (e.g., NODE-j 11j for j=1, . . . , L).

From the perspective of first node=NODE-0 110, each second node=NODE-j may also be referred to as a peer node (PEER-j) for j∈[1, . . . , L]. Also, each PEER-j 11j may be (a) a neighbor node with a direct connection, or (b) a non-neighbor node with an indirect connection via at least one other node. For example, NODE-0 110 is directly connected with three neighbor nodes: NODE-1 111, NODE-2 112 and NODE-3 113. Further, NODE-0 110 is indirectly connected with three non-neighbor nodes: NODE-4 114, NODE-5 115 and NODE-6 116. Each non-neighbor is reachable via at least one neighbor.

Depending on the desired implementation, NODE-0 111 may select neighbor nodes from a set of peer nodes known as a peerset, such as {PEER-j 11j, j=1, . . . , L} provided by bootstrap server(s). Although seven (i.e., L=6 and L+1=7) nodes are shown in P2P network 100 for simplicity, there may be hundreds or thousands of nodes in practice depending on application(s). As will be described using FIG. 8, each node in P2P network 100 may be implemented using at least one virtualized computing instance (e.g., virtual machine (VM), container, etc.) or physical machine (e.g., bare metal machine), etc.

In practice, P2P networks may be classified into various categories, such as structured (e.g., highly structured, loosely structured) and unstructured. Based on these classifications, rules may be defined to dictate P2P network topology or control over data flow. For example, in an unstructured network, content is generally not associated with peers, and approaches such as query forwarding are utilized by nodes to execute search for data. Because there exists no correlation between content managed by a node and itself, the execution of search query requires a flooding mechanism that results in ineffective search efficiency. On the other hand, structured networks differ on the basis that content is associated with the nodes, and a flooding mechanism is not required hence more efficient search mechanisms/executions may be used.

In some cases, there is a requirement to maintain a replicated state in a decentralized network where consensus protocol is used to maintain synchronization across all the nodes about a knowledge state, such as a distributed ledger in a blockchain network. The effectiveness of synchronization depends mainly on the nature of the protocol but in real world case the efficiency of protocol may depend on a variety of factors. One factor is the decentralized state of the network itself, i.e. how nodes are connected to each other that in turn helps how the data generated by an individual node (e.g., NODE-0 110) is spread across to other nodes (e.g., PEER-j 11j, for j=1, . . . , L). In general, in addition to latency over spread of information, the ability for nodes to recall or search for distributed data over an overlay network is an important utility in either structured or unstructured networks. Both of these functionalities may be improved by providing nodes with a better/wider reach.

One of the main barriers for effective communication is unreliability that exists in the structural formation of P2P network 100. For example, inherent nature of decentralized networks dictates nodes to randomly pick neighbors from a peerset provided by bootstrap servers. Such random approach may lead to local cluster formation or weakly-connected communities. This may in turn lead to the formation of suboptimal network topology, such as P2P network 100 with a substantially large network diameter. In this case, the spread of information from a source node and the farthest node from the source node may experience a substantially high latency, which lacks efficiency and affects the performance of nodes in P2P network 100.

Decentralized Network Topology Adaptation

According to examples of the present disclosure, decentralized network topology adaptation may be implemented to break suboptimal connection(s), thereby reducing the likelihood of a suboptimal network topology in P2P network 100. Throughout the present disclosure, the term "network topology adaptation" may refer generally to the adjustment or modification of a P2P network topology, including breaking or maintaining an existing connection between a pair of nodes, adding a new connection between a pair of nodes, etc. For example, network topology adaptation may be implemented to facilitate network topology contraction to reduce the likelihood of forming a suboptimal network topology having a substantially large network diameter. Examples of the present disclosure may be performed by nodes in a P2P network in a decentralized manner without necessitating the participation of a central authority or controller.

Figure 2:
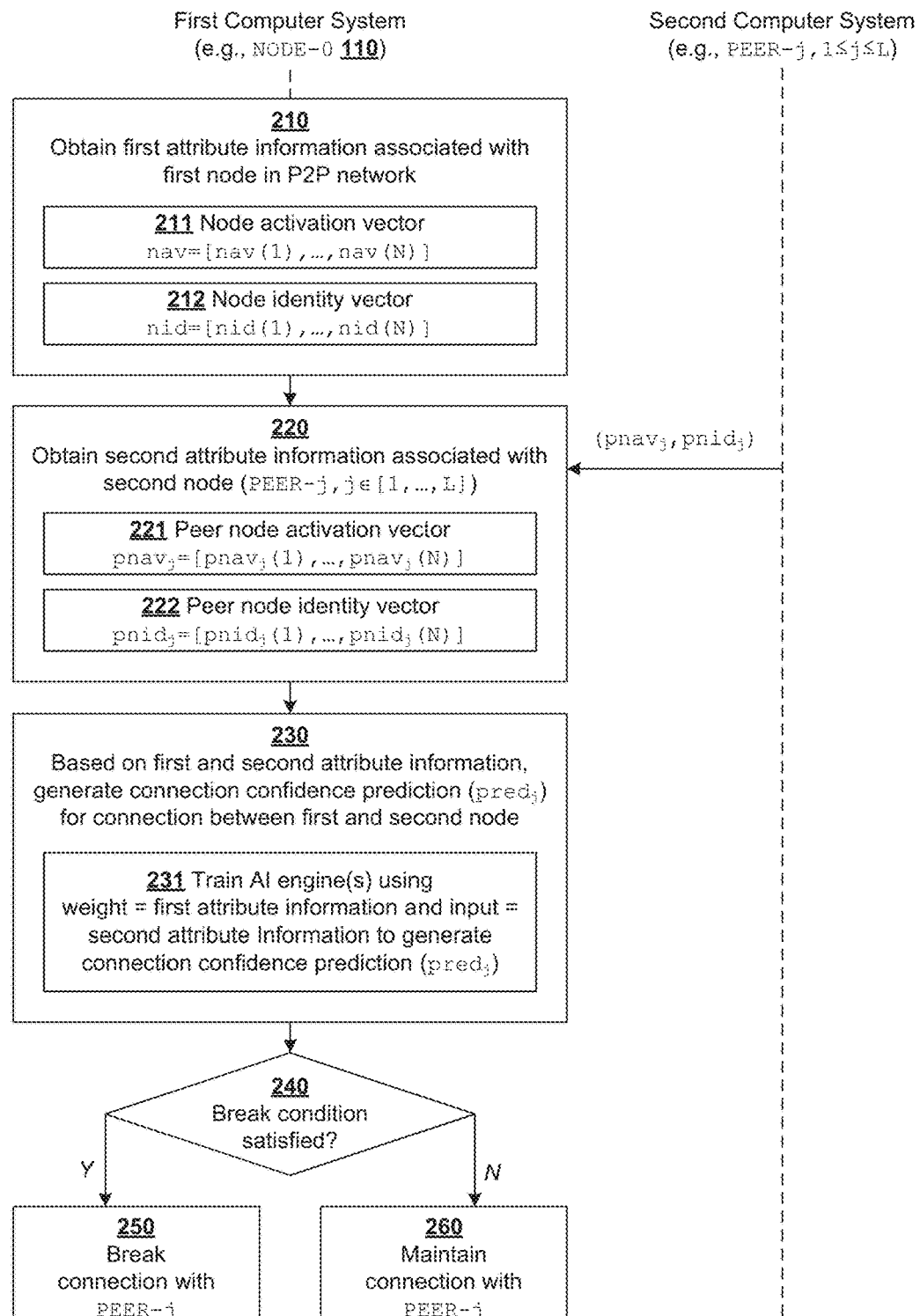
FIG. 2 is a flowchart of an example process for a first node to perform decentralized network topology adaptation in a P2P network.

In more detail, FIG. 2 is a flowchart of example process 200 for a first node to perform decentralized network topology adaptation in P2P network 100. Example process 200 may include one or more operations, functions, or actions illustrated by one or more blocks, such as 210 to 260. Depending on the desired implementation, various blocks may be combined into fewer blocks, divided into additional blocks, and/or eliminated. In the following, various examples will be explained from the perspective of first node=NODE-0 110 ("first computer system") with respect to second node(s)=PEER-j 11j for j=1, . . . , L ("second computer system(s)"). It should be understood that any suitable node in P2P network 100 may act as a "first computer system" to implement network topology adaptation in a decentralized manner with respect to a different set of "second computer system(s)."

At 210 in FIG. 2, first attribute information associated with first node=NODE-0 110 may be obtained, such as by retrieving the information from storage or memory, etc. In the example in FIG. 1, first attribute information 120 may include any suitable embedding(s) or vector(s), such as a node identity vector (denoted as nid) and/or a node activation vector (denoted as nav). Each vector may be of dimension=1×N (i.e., N elements). See also 121-122 in FIG. 1 and 211-212 in FIG. 2.

At 220 in FIG. 2, second attribute information associated with second node=PEER-j 11j may be obtained, such as the first node receiving or retrieving the information from the second node, or via at least one other node. In the example in FIG. 1, second attribute information 140 associated with PEER-1 111 to PEER-6 116 may include any suitable embedding(s) or vector(s), such as a peer node identity vector (denoted as $pnid_j$) and/or a peer node activation vector (denoted as $pnav_j$) for PEER-j 11j. It should be noted that, from the perspective of each second node, $pnid_j=nid_j$ and $pnav_j=nav_j$. Attribute information 120/140 will be explained further using FIGS. 3-5 below. See also 130, 141-146 in FIG. 1 and 221-222 in FIG. 2.

At 230 in FIG. 2, a connection confidence prediction (denoted as $pred_j$) may be generated based on first attribute information 120 and second attribute information 140. The connection confidence prediction may indicate whether a connection between first node=NODE-0 110 and second node=PEER-j 11j is a suboptimal connection associated with a suboptimal network topology in P2P network 100.

Here, the term "connection confidence prediction" may refer generally to a characteristic associated with a connection between two nodes that may be used to indicate or detect whether the connection is suboptimal.

At 240 and 250 in FIG. 2, in response to determination that the connection confidence prediction satisfies a break condition that is configured to detect the suboptimal connection, first node=NODE-0 110 may break its connection with the second node (i.e., remove direct connection). Otherwise (i.e., break condition not satisfied), at 260, the connection with the second node may be maintained. Depending on the desired implementation, block 240 may be performed to detect suboptimal connections based on a user-configurable connection confidence threshold (T), a probability distribution function, etc.

Depending on the desired implementation, examples of the present disclosure may be implemented to facilitate network topology contraction (to be discussed below). In this case, the connection confidence prediction may be associated with a connection strength of the connection between a pair of first node=NODE-0 110 and second node=PEER-j 11j. The connection strength may be used to indicate whether the connection is a suboptimal connection associated with a suboptimal network topology having a substantially large network diameter, which is undesirable because it may incur a higher latency to spread data from a source node to the farthest node(s).

Using examples of the present disclosure, connection confidence prediction may be performed to detect and break suboptimal connections (e.g., connection strength exceeding a threshold) to, for example, achieve more randomness in network structural formation. This has the effect of incentivizing nodes to form and maintain connections with better reach in P2P network 100. The randomness may be achieved when the nodes are connected as densely as possible so that no local structural feature may be learned, which is a side effect that leads to network topology contraction. This improves the likelihood of more random connections among nodes as well as discourages the formation local clusters or weakly-connected communities that are suboptimal for data spread in P2P network 100. Blocks 210-250 may be performed by nodes in P2P network 100 to continuously break suboptimal connections and form new (e.g., random) connections until there is no connection confidence prediction that satisfies the break condition.

Three examples 171-173 are shown in FIG. 1. In a first example, first node=NODE-0 110 may break its connection with second node=PEER-1 111 based on $pred_1$=connection confidence prediction associated with a connection with PEER-1 111 (see 171). In a second example, first node=NODE-0 110 may maintain its connection with PEER-2 112 based on $pred_2$=connection confidence prediction associated with a connection with PEER-2 112 (see 172). In a third example, first node=NODE-0 110 break its connection with PEER-3 113 based on $pred_3$=connection confidence prediction associated with a connection with PEER-3 113 (see 173).

Depending on the desired implementation, decentralized network topology adaptation according to examples of the present disclosure may be implemented using artificial intelligence (AI) engine(s). For example, block 230 in FIG. 2 may include training AI engine(s) using first attribute information 120 associated with first node=NODE-0 110 and second attribute information 140 associated with second node=PEER-j 11j for $j \in 1, \ldots, L$. In this case, block 230 may include applying the AI engine(s) to generate the connection confidence prediction. See 231-232 in FIG. 2.

As used herein, the term "AI engine" may refer to any suitable hardware and/or software component(s) of a computer system that are capable of executing algorithms according to any suitable AI model(s). Depending on the desired implementation, example AI model(s) may include neural network that will be discussed using FIGS. 4-5, deep learning model, deep belief network, generative adversarial network (GAN), autoencoder(s), variational autoencoder(s), long short-term memory architecture for tracking purposes, any combination thereof, etc. In practice, any suitable neural network(s) may be used, such as convolutional neural network, recurrent neural network, etc. A convolutional neural network may be implemented using any suitable architecture(s), such as UNet, LeNet, AlexNet, ResNet, VNet, DenseNet, OctNet, etc.

Using examples of the present disclosure, each node may iteratively learn and improve its node attribute information to gauge its structural connectivity with its neighbors. Examples of the present disclosure should be contrasted against centralized approaches that require a centralized or single source of computation to which network data needs to be sent. For example, NODE-0 110 may start improving its first attribute information 120 based on second attribute information 140 associated with peer nodes 111-116 after joining P2P network 100. In practice, examples of the present disclosure may be implemented to help structured or unstructured P2P networks to achieve a better topographical state without any dependency on trusted authority. Various examples will be discussed using FIGS. 3-8 below.

First and Second Attribute Information

Figure 3:
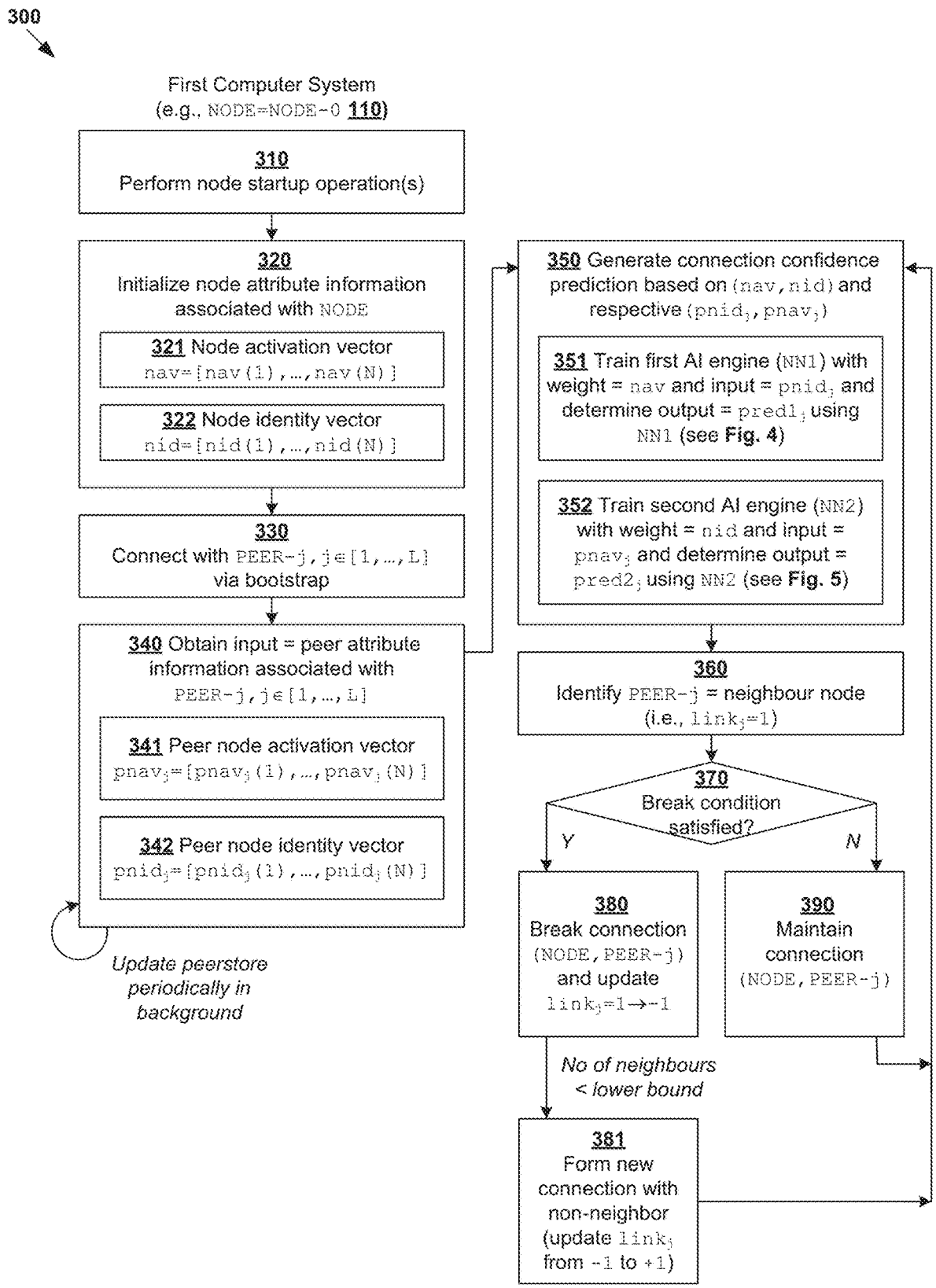
FIG. 3 is a flowchart of an example detailed process for a first node to perform decentralized network topology adaptation in a P2P network.

FIG. 3 is a flowchart of example detailed process 300 for a first node to perform decentralized network topology adaptation in P2P network 100. Example process 300 may include one or more operations, functions, or actions illustrated by one or more blocks, such as 310 to 390. Depending on the desired implementation, various blocks may be combined into fewer blocks, divided into additional blocks, and/or eliminated. In the following, various examples will be discussed using first node=NODE-0 110 and second node=PEER-j 11j for $j \in 1, \ldots, L$. In some embodiments, examples of the present disclosure may be referred to as a neural shrink gossip (NSG) protocol for network topology contraction in P2P network(s) using real-time nodes.

(a) First Attribute Information (nav, nid)

At 310 in FIG. 3, first node=NODE-0 110 may perform node startup operation(s) when joining P2P network 100 according to any suitable P2P protocol. At 320, first node=NODE-0 110 may initialize its first attribute information, such as using random values, etc. The first attribute information may include two N-dimensional embeddings or vectors: (a) node activation vector denoted as nav and (b) node identity vector denoted as nid. For simplicity, nav=$nav_0$ and nid=$nid_0$. Each $i^{th}$ element in nav may be denoted as nav(i), where nav=nav(1), ..., nav(N) for i=1, ..., N. Similarly, each element in nid may be denoted as nid(i), where nid=nid(1), ..., nid(N) for i=1, ..., N. See 121-122 in FIG. 1 and 321-322 in FIG. 3.

For example, nid may be configured to represent an identity of NODE-0 110 that is unique in a network space. In this case, nid may specify an identity representation associated with NODE-0 110, such as its unique placement in a latent space with respect to all other nodes (i.e., PEER-j 11j for $j \in 1, \ldots, L$) in P2P network 100. The values of nid may be trained capture the fingerprint of a node that is unique in a Hilbert space where all nodes in P2P network 100 exist.

Further, nav may specify an egocentric representation associated with NODE-0 110, such as of how NODE-0 110 interacts with the second attribute information (e.g., $pnid_j$) of peer nodes in P2P network 100. In other words, nav may provide a node's egocentric view that a peer node's $pnid_j$ may react to produce connection confidence in a P2P network setting. Depending on the desired implementation, both nid and nav may be included in the first attribute information. In some cases, having a single vector may give an opportunity for perceptron(s) to converge in a state where all vectors are identical by hitting a local minima without encoding structural connectivity into the embeddings.

(b) Connecting with Peer Nodes

At 330 in FIG. 3, first node=NODE-0 110 may connect with PEER-j 11j for j=1, . . . , L based on information provided by bootstrap server(s). Each PEER-j 11j may be a neighbor or non-neighbor node. For tracking purposes, NODE-0 110 may maintain a vector denoted as link={$link_j$, j=1, . . . , L}. Here, each value $link_j \in \{-1, +1\}$ to indicate whether PEER-j 11j is a neighbor (i.e., $link_j$=+1) and non-neighbor (i.e., $link_j$=−1). For example in FIG. 1, $link_j$=1 for neighbor nodes PEER-1 111, PEER-2 112 and PEER-3 113 (i.e., j=1, 2, 3). In contrast, $link_j$=−1 for non-neighbor nodes PEER-4 114, PEER-5 115 and PEER-6 116 (i.e., j=4, 5, 6). As will be discussed below, $link_j$ may be used in loss function(s) to train AI engine(s).

(c) Second Attribute Information ($pnav_j$, $pnid_j$)

At 340 in FIG. 3, first node=NODE-0 110 may obtain (e.g., receive or retrieve) second attribute information associated with multiple second nodes=PEER-j 11j for j=1, . . . , L. For PEER-j 11j, the second attribute information may include two N-dimensional embeddings or vectors: (a) peer node activation vector denoted as $pnav_j$ and (b) peer node identity vector denoted as $pnid_j$. Each $i^{th}$ element in $pnav_j$ and $pnid_j$ may be denoted as $pnav_j(i)$ and $pnid_j(i)$, respectively. For j=1, . . . , L and i=1, . . . , N, $pnav_j$= $pnav_j(1)$, . . . , $pnav_j(N)$ and $pnid_j$=$pnid_h(1)$, . . . , $pnid_j(N)$. See $pnav_j$ and $pnid_j$ for each PEER-j 11j. See 141-146 in FIGS. 1 and 341-342 in FIG. 3.

Similarly, $pnid_j$=$nid_j$ may specify an identity representation associated with PEER-j 11j, such as of its unique placement in a latent space with respect to all other nodes in P2P network 100. $pnav_j$=$navi_j$ may specify an egocentric representation associated with PEER-j 11j, such as of how PEER-j 11j interacts with the identity representation of other nodes in P2P network 100. In practice, NODE-0 110 and PEER-j 11j may distribute respective (nav, nid) and ($pnav_j$, $pnid_j$) periodically to facilitate decentralized network topology adaptation. In practice, NODE-0 110 may obtain second attribute information associated with one or more non-neighbors (e.g., PEER-4 114 and/or PEER-5 115) via a neighbor (e.g., PEER-1 111).

(d) Dissemination of Attribute Information

In practice, each node may maintain an attribute peerstore to store ($pnav_j$, $pnid_j$) associated with peer nodes it encounters and shared by its neighbors. The maximum cap on the peerstore's size may be user-defined. A removal/acceptance policy (e.g., random policy) when the maximum is reached may also be configured. Depending on the desired implementation, each node may share its first attribute information and K≥L sets of second attribute information it learns from other nodes. Embeddings may be updated by the owner node and hence a mechanism is required for non-neighbor nodes to differentiate between newly updated embeddings and old embeddings shared with them in the past.

A parameter called "attribute history" or "history" may be used to track temporal updates. The parameter is initialized at zero when random embeddings are generated during node's first boot. When neighbor nodes (e.g., PEER-1 111, PEER-2 112 and PEER-3 113 for NODE-0 110) share peer node attribute information, a node only update embedding in the peerstore if history is greater than what currently exists. Since the attribute information associated with each node includes two N-dimensional vectors with floating point values, a total of 2N*4+8+d bytes may be required to store the attribute information. Here, the addition of 8 denotes history as a long data type and d is representation of node ID and node reachability details to start connection dial up.

Depending on protocol implementation, each node may share (2N*4+8+d)*K bytes per neighbor node over a regular interval of time. Hence such a substantially tiny amount of data may be integrated with distributed hash table (DHT) protocol messages for structured P2P networks or sent over the wire with ping-pong/gossip protocol of any unstructured P2P network implementation. Decentralized network topology adaptation according to examples of the present disclosure may be implemented using this data transfer among decentralized nodes. For example, to share the attribute information of 20 peer nodes where N=11, node ID=sha256 hash of public key (i.e. 32 bytes) and d=18 bytes for dial up details, the bandwidth requirement is 2920 bytes per connection over every 30 seconds. In practice, a random selection may be used to select those 20 sets of peer attribute information irrespective of when they were updated.

Training and Prediction Using AI Engines (a) AI Engines

Figure 4:
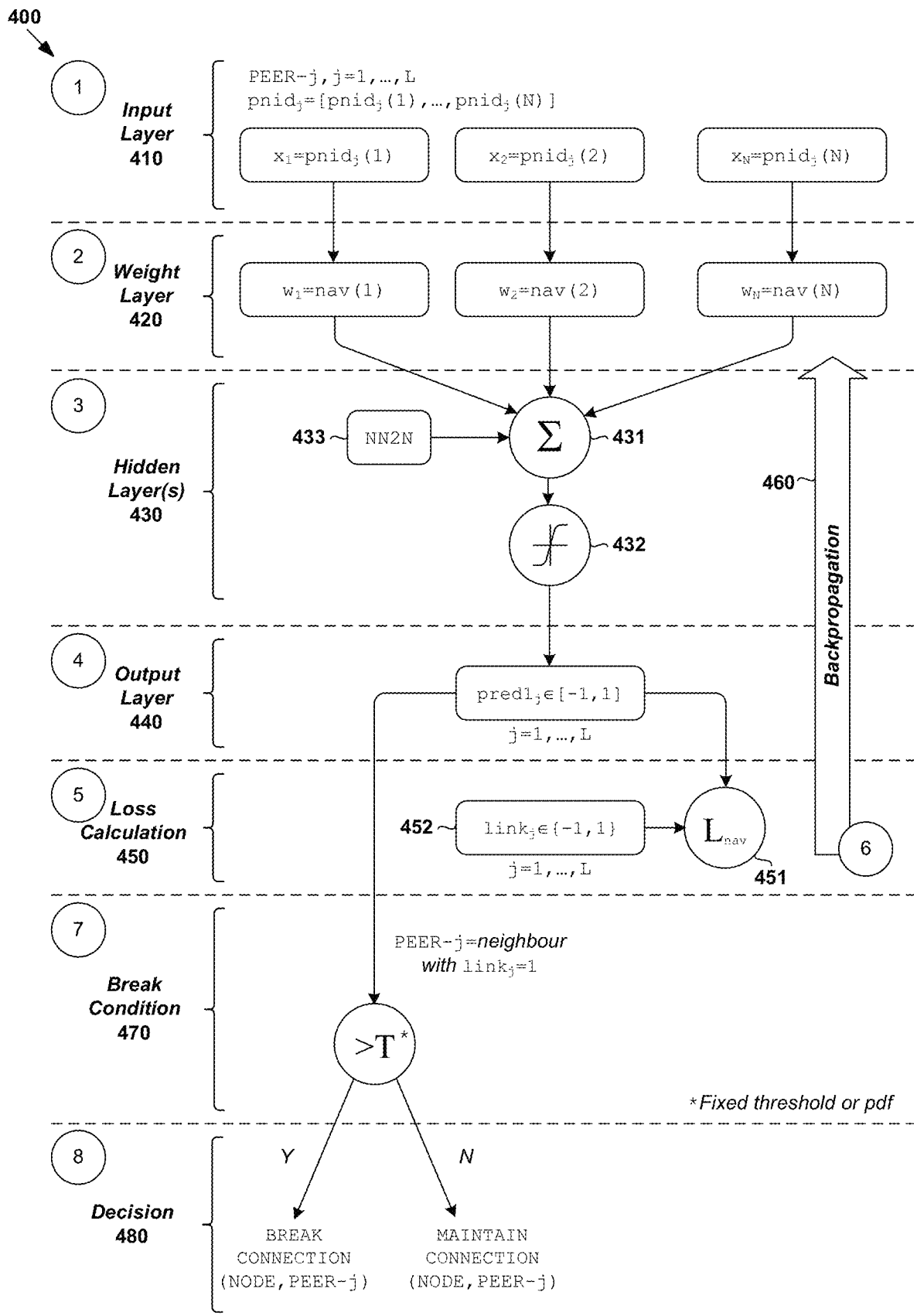
FIG. 4 is a schematic diagram illustrating a first example of connection confidence prediction based on a node activation vector associated with a first node and a peer node identity vector associated with a second node.
Figure 5:
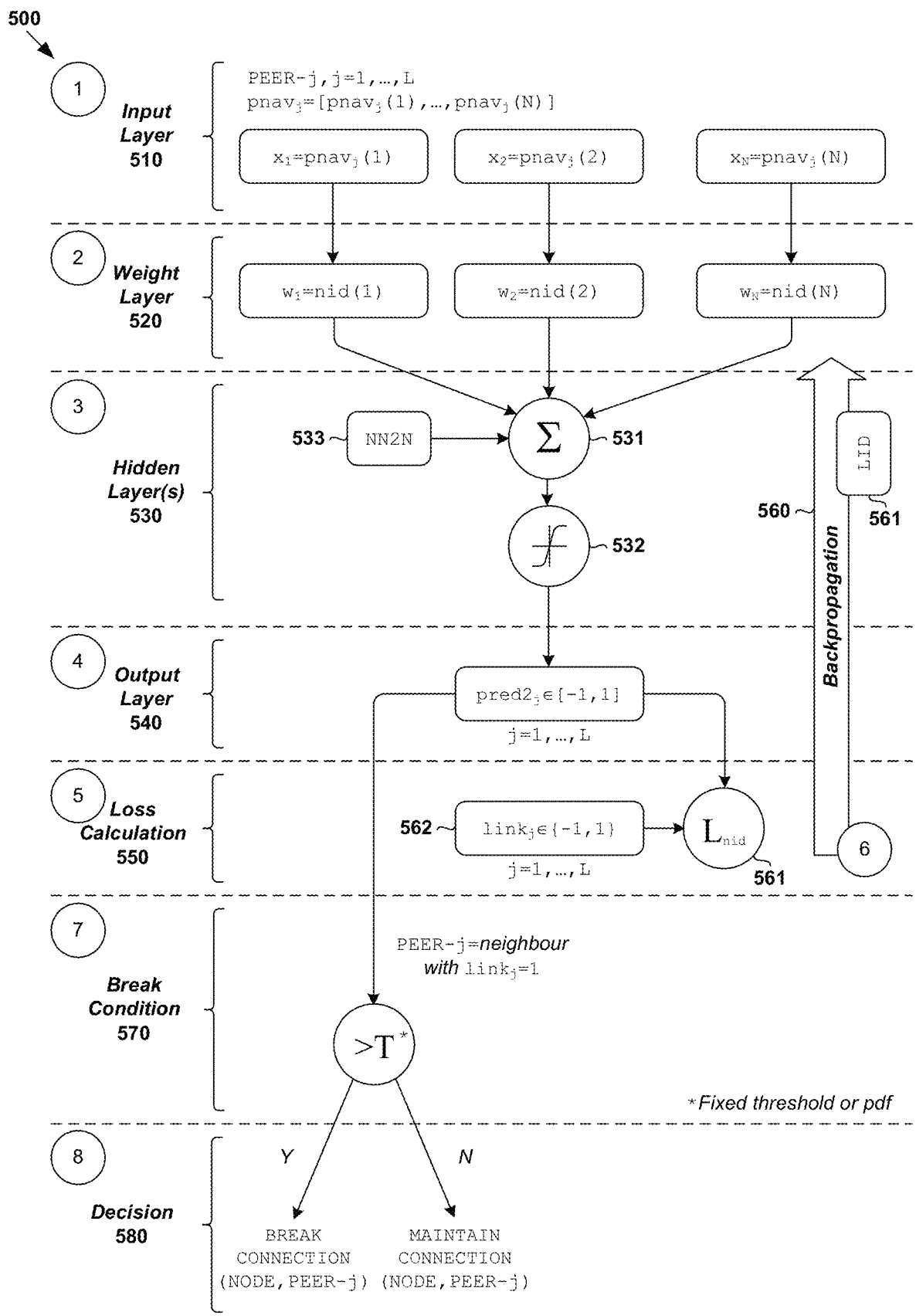
FIG. 5 is a schematic diagram illustrating a second example of connection confidence prediction based on a node identity vector associated with a first node and a peer node activation vector associated with a second node.

At 350 in FIG. 3, based on the first and second attribute information, first node=NODE-0 110 may generate connection confidence prediction(s) using AI engine(s). Two example neural networks with a single perceptron are shown in FIGS. 4-5.

(1) In a first example (see 351 and FIG. 4), a first neural network ("first AI engine") denoted as NN1 may be trained using (a) weight=nav associated with NODE-0 110 and (b) input=$pnid_j$ associated with PEER-j 11j. The first neural network may be applied to generate a first connection confidence prediction ($pred1_j$) associated with a connection between NODE-0 110 and PEER-j 11j.

(2) In a second example (see 352 and FIG. 5), a second neural network ("second AI engine") denoted as NN2 may be trained using (a) weight=nid associated with NODE-0 110 and (b) input=$pnav_j$ associated with PEER-j 11j. The second neural network may be applied to generate a second connection confidence prediction ($pred2_j$) associated with a connection between NODE-0 110 and PEER-j 11j.

In general, a perceptron may represent a neural network unit that includes input values, weight values and bias, a weighted sum and an activation function. In practice, neural networks with a single perceptron, or a multi-layer perceptron, may be used. For example, block 350 may involve AI engine(s) in the form of deep learning engine(s). In general, deep learning is a subset of machine learning in which multi-layered neural networks may be used for feature extraction as well as pattern analysis and/or classification. A deep learning engine may include a hierarchy of "processing layers" of nonlinear data processing that include an input layer, an output layer, and multiple (i.e., two or more) "hidden" layers between the input and output layers.

(b) Break Condition and Decision

At 360-370, first node=NODE-0 110 may determine whether a break condition is satisfied based on a connection confidence prediction associated with a connection between NODE-0 110 and a neighbor node (i.e., PEER-j 11j with a direct connection). If yes (see 380), NODE-0 110 may break the connection. Otherwise (see 390), the connection may be maintained. Depending on the desired implementation, block 380 may involve breaking or terminating a Transmission Control Protocol (TCP) connection between NODE-0 110 and PEER-j 11j that is established over an overlay network associated with P2P network 100. Any alternative protocol for breaking or forming connection(s) may be used.

The break condition may be configured to detect suboptimal connection(s) that lead to a suboptimal network topology. For example, the determination at block 370 may be based on a comparison between (a) a connection confidence prediction and (b) a connection confidence threshold (T). In another example, the determination may be performed based on a probability distribution function. Any additional or alternative statistical parameter(s) may be used. If the break condition is satisfied (e.g., prediction is stronger than T), NODE-0 110 may break the connection and try to form a new connection with a non-neighbor node from the peerset.

Each node may iterate over blocks 340-390 to break and form new connections, thereby encouraging nodes in P2P network 100 to break connections that lead to a suboptimal network topology. In at least some embodiments, the intuition is that nodes may utilize regression-based learning approaches to predict connections with respect to their peer nodes (i.e., neighbors and non-neighbors). This way, connection confidence prediction may be performed based on underlying information describing how network substructure exists, which happens when nodes are connected in a particular manner such as small communities that result in strong bonds. The decision to break and form connection(s) may continue until a stopping condition is reached, such as when connected nodes are unable to do a link prediction with respect to each other above the threshold (T). This helps create a (more) random network substructure in that no feature may be learned to achieve a randomly connected state.

(c) Selection of New Neighbor

At 381 in FIG. 3, NODE-0 110 may form a new connection with a non-neighbor from peerset={PEER-j 11j, j=1, . . . , L}. Depending on the desired implementation, lower and upper bounds associated with the number of neighbors may be defined for each node. In this case, NODE-0 110 may not form a new connection with a peer node (e.g., NODE-6 116) until the number of active connections falls below the lower bound. In practice, the new connection may be formed using TCP (or any alternative protocol) over an overlay network associated with P2P network 100. During new connection dial up, NODE-0 110 may use any suitable approach to search for new neighbor.

A first approach is to query P2P network 100 to suggest a random peer node with which a connection may be established. A second approach is to select a new neighbor based on the prediction result ($pred_j$) at block 350. In this case, NODE-0 110 may identify a non-neighbor node PEER-j 11j that is associated with a negative prediction value (i.e., $pred_j<0$). As will be discussed further below (see "Security" section), the second approach may be susceptible to malicious nodes surrounding and targeting nodes based on node ID utilizing adversarial embedding generation. In this case, both the first and second example approaches may be implemented (e.g., with equal probability) to establish randomness in the selection of new neighbor node(s).

First Example AI Engine Using (nav, $pnid_j$)

FIG. 4 is a schematic diagram illustrating first example 400 of connection confidence prediction based on a node activation vector associated with a first node and a peer node identity vector associated with a second node.

(a) Input and Weight

At 410-420 in FIG. 4, a first neural network (NN1) may be trained using (a) weight=nav associated with NODE-0 110 and (b) input=$pnid_j$ associated with PEER-j 11j. Here, weight values nav(1), . . . , nav(N) may form a weight layer, and input values $pnid_j(1)$, . . . , $pnid_j(N)$ an input layer to NN1. In this case, nav associated with NODE-0 110 may be trained as weight values of a perceptron by consuming $pnid_j$ associated with PEER-j 11j.

(b) Connection Confidence Prediction

At 430-440 in FIG. 4, hidden layer(s) of the first neural network may process (input=$pnid_j$, weight=nav) to generate a first connection confidence prediction ($pred1_j$) associated with a connection between NODE-0 110 and PEER-j 11j as follows (see 431-432):

$$pred1_j = \tanh \sum_{i=1}^{N} (pnid_j(i)nav(i)).$$

In one example, the prediction ($pred1_j$) may be associated with a connection strength of the connection from the point of view of NODE-0 110. In the above, tanh( ) is an example activation function where numerical 1 represents the existence of a connection, and −1 represents the absence of one. In general, an activation function decides whether a neuron of a neural network should be activated or not. Any alternative activation function may be used, such as sigmoid, rectified linear unit (ReLU), etc.

During training, a first hyperparameter (see 433) called non-neighbor to neighbor (NN2N) ratio may be used to reduce or remove sampling bias from input to perceptron(s), which will be a batch of ($pnav_j$, $pnid_j$) associated with multiple neighbor/non-neighbor nodes. In practice, nodes may store embeddings of large number of peer nodes while being connected to very few nodes in the network. When training using embeddings of all nodes, there might be a sampling bias in training. This may in turn cause the training to settle in a local minima where embeddings may always predict absence of connection for all inputs and still be highly accurate because of disparity between number of neighbors and non-neighbors. Hence, the NN2N ratio may be used to generate a batch where for every K neighbors in the batch, there is a maximum of NN2N times K number of non-neighbors and at least one neighbor.

(c) Loss Calculation

At 450 in FIG. 4, a loss function may be applied to quantify a difference between the first connection confidence prediction ($pred1_j$) and an expected prediction ($link_j$). Here, $link_j \in \{-1, +1\}$ where −1 indicates that PEER-j 11j is a non-neighbor node (i.e., no direct connection with NODE-0 110) and +1 indicates that PEER-j 11j is a neighbor node (i.e., has a direct connection with NODE-0 110). One example is to compute a mean squared error (MSE) between the prediction and link$_j$, as follows:

$$L_{nav} = \frac{1}{L}\Sigma_{j=1}^{L}(pred1_j - link_j)^2.$$

At 460 in FIG. 4, backpropagation (i.e., backward propagation of errors) may be performed to update node activation vector nav=nav(1), . . . , nav(N) based on the loss calculation using L$_{nav}$. For example, backpropagation may involve calculating the gradient of the loss function with respect to the weight values. This allows the node activation vector (nav) to be updated or fine-tuned over time based on pnid$_j$ associated with other peer nodes.

(d) Break Condition and Decision

At 470 in FIG. 4, NODE-0 110 may determine whether the first connection confidence prediction (pred1$_j$) for a connection between NODE-0 110 and a neighbor node (i.e., PEER-j 11j with link$_j$1=1) satisfies a break condition. At 480, a decision to break the connection may be made in response to determination that a connection confidence threshold (T) is exceeded (i.e., pred1$_j$>T). Alternatively, a probabilistic approach may be used using a probability distribution function, etc. Otherwise, at 490, the connection may be maintained.

Second Example AI Engine Using (nid, pnav$_j$)

FIG. 5 is a schematic diagram illustrating second example 500 of training and connection confidence prediction based on a node identity vector associated with a first node and a peer node activation vector associated with a second node.

(a) Input and Weight

At 510-520 in FIG. 5, a second neural network (NN2) may be trained using (a) weight=nid associated with NODE-0 110 and (b) input=pnav$_j$ associated with PEER-j 11j. Here, weight values nid(1), . . . , nid(N) form a weight layer, and input values pnav$_j$(1), . . . , pnav$_j$(N) form an input layer to NN2. In this case, nid associated with NODE-0 110 may be trained as weight values of a perceptron by consuming pnav$_j$ associated with PEER-j 11j.

(B) Connection Confidence Prediction

At 530-540 in FIG. 5, hidden layer(s) of the second neural network may process (input=pnav$_j$, weight=nid) to generate a second connection confidence prediction (pred2$_1$) associated with a connection between NODE-0 110 and PEER-j 11j as follows (see 531-532):

$$pred2_j = \tanh\sum_{i=1}^{N}(pnav_j(i)nid(i)).$$

In one example, the prediction (pred2$_j$) may be associated with a connection strength of the connection from the point of view of PEER-j 11j. Similar to the example in FIG. 4, tanh( ) is an example activation function where numerical 1 represents the existence of a connection, and −1 represents the absence of one. Also, an NN2N ratio (see 533) may be used to remove sampling bias from input to perceptron(s), which will be a batch of (pnav$_j$, pnid$_j$) associated with multiple neighbor/non-neighbor peer nodes. The NN2N ratio may be used to generate a batch where for every K neighbors in the batch, there is a maximum of NN2N times K number of non-neighbor nodes and at least one neighbor node in each batch.

(c) Loss Calculation

At 550 in FIG. 5, a loss function may be applied to quantify a difference between the second connection confidence prediction (pred2$_j$) and an expected prediction (link$_j$). Here, link$_j$∈{−1, +1} where −1 indicates that PEER-j 11j is a non-neighbor node and +1 indicates that PEER-j 11j is a neighbor node. In one example, the goal is to increase dissimilarity between nid (i.e., an identity representation of NODE-0 110) and pnid$_j$ of other nodes, as follows.

$$L_{nid} = \frac{1}{L}\sum_{j=1}^{L}(pred2_j - link_j)^2 - \frac{dc}{L*N}\sum_{L}^{j=1}\sum_{i=1}^{N}(nid(i) - pnid_j(i))^2.$$

Compared to L$_{nav}$ in the first neural network, L$_{nid}$ includes a dissimilarity component to train nid to be unique and as dissimilar as possible from its neighbor and non-neighbor nodes. Hyperparameter dc represents a dissimilarity constant where NODE-0 110 tries to maintain a unique nid with respect to pnid$_j$ associated with neighbor and non-neighbor nodes.

At 560 in FIG. 5, backpropagation (i.e., backward propagation of errors) may be performed to update node identity vector nid=nid(1), . . . , nid(N) based on the loss calculation using L$_{nid}$. In practice, backpropagation may involve calculating the gradient of the loss function with respect to the weight values. This allows the node identity vector (nid) to be updated or fine-tuned over time based on (pnav$_j$, pnid$_j$) associated with other peer nodes.

(d) Blurring Effect Using Local Identity Damper (LID)

Depending on the desired implementation, a second hyperparameter (see 561) called local identity damper (LID) may be used as a blurring effect when updating node identity vector nid=nid(1), . . . , nid(N). Since a node's field of vision is generally limited to their neighbors without and no node is made aware of world beyond its 1st neighborhood, this may cause each node to treat all non-neighbor nodes equally irrespective of which m$^{th}$ neighborhood they belong to. In this case, LID may be used to fix such behavior.

For example, LID∈[0,1) may be used in averaging a node identity vector (nid) based on multiple peer node identity vectors (pnid$_j$). LID may be provided as a weightage over mean of all pnid$_j$ associated with neighbor nodes. In this case, nid may be weighted using m∈[1, . . . , L] and link$_m$=1 (i.e., neighbor node):

$$nid*(1-LID)+(\frac{1}{M}\sum_{m=1}^{M}pnid_m)*LID.$$

In practice, averaging may go against the dissimilarity loss introduced while training a node identity vector to keep it unique but that is generally used as a fingerprint in a global sense. While averaging is used to keep the ID closer to that of its neighbor which will be effective when neighbors are tightly interconnected and will provide no value if neighbors are spread out across the network and act as a random offset introduced to node's identity.

(e) Break Condition and Decision

At 570 in FIG. 5, NODE-0 110 may determine whether a break condition is satisfied for a connection between NODE-0 110 and a neighbor node (i.e., PEER-j 11j with link$_j$=1). At 580, a decision to break the connection may be made in response to determination that the connection is suboptimal, such as based on whether the prediction exceeds a connection confidence threshold (T). Otherwise, at 590, the connection may be maintained. The thresholds used in the examples in FIGS. 4-5 may be the same, or different ones.

(f) Comparison Between $pred1_j$ and $pred2_j$

In practice, $pred1_j$ generated based on ($nav \times pnid_j$) using the first neural network in FIG. 4 may represent a connection confidence prediction from the point of view of NODE-0 110. In contrast, $pred2_j$ generated based on ($nid \times pnav_j$) using the second neural network in FIG. 5 may represent a connection confidence prediction from the point of view of PEER-j 11j. NODE-0 110 may determine whether the break condition is satisfied based on $pred1_j$ and/or $pred2_j$.

In one example, NODE-0 110 may determine that the break condition is satisfied in response to determination that $pred1_j > T$. PEER-j 11j may determine that the break condition is satisfied in response to determination that $pred2_j > T$. In other words, either NODE-0 110 or PEER-j 11j may break the connection based on their own prediction(s). This way, each node may implement network topology adaptation in a decentralized and independent manner to break and maintain connections, such as to facilitate network topology contraction to reduce network diameter.

Example Network Contraction

Some examples will be discussed using FIG. 6, which is a schematic diagram illustrating example decentralized network topology adaptation 600 in a P2P network with star-barbell topology. In the example in FIG. 6, consider a P2P network with 23 nodes that form a star-barbell topology having two clusters that are connected by a single array of nodes. The star-barbell topology is suboptimal because, inter alia, of its substantially large network diameter. For example, to propagate data from source node=1 to target node=15, the number of hops required is 11 (via a path with nodes 7, 6, 5, 11, 12, 13, 18, 23, 22 and 21). See 610, 620 and 630 in FIG. 6.

Figure 6:
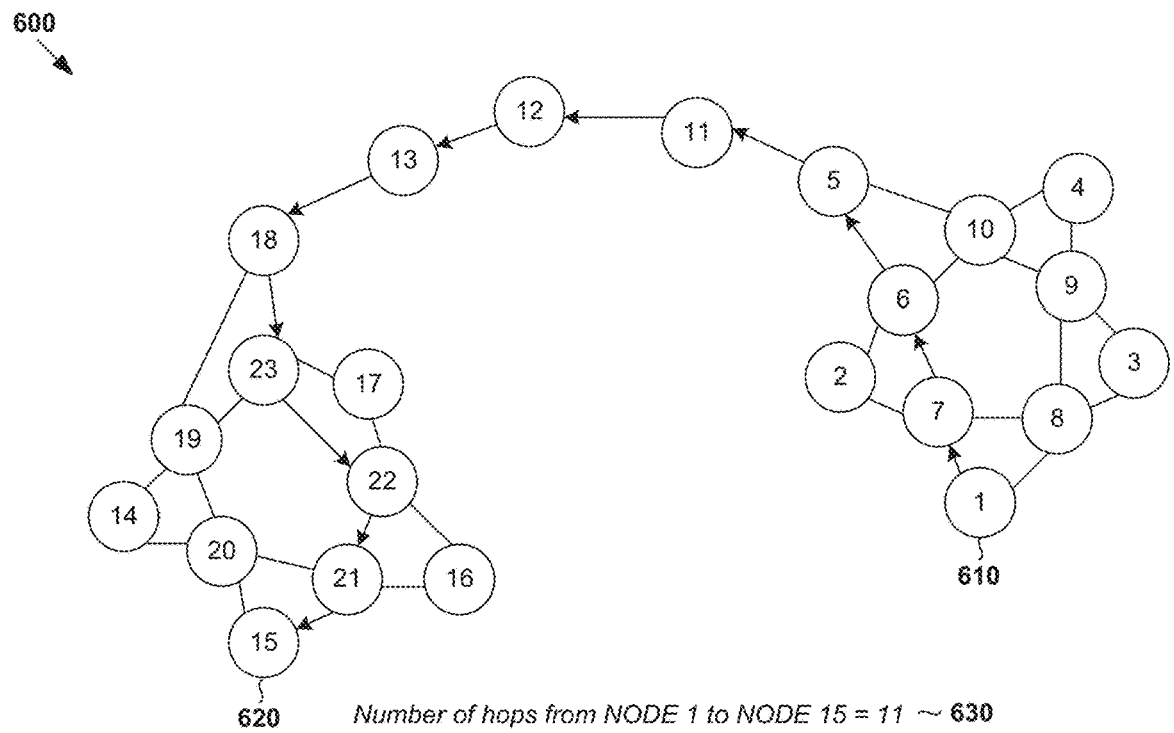
FIG. 6 is a schematic diagram illustrating an example decentralized network topology adaptation in a P2P network with a star-barbell topology.
Figure 6:
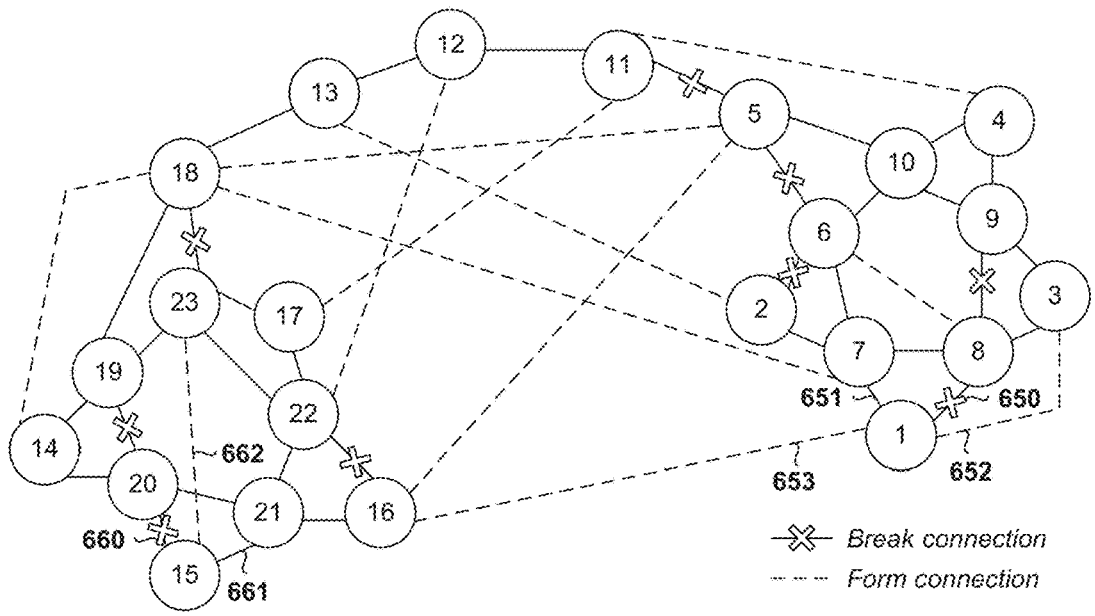

According to examples of the present disclosure, network topology adaptation may be implemented in a decentralized manner (see 640 in FIG. 6). In particular, each of the 23 nodes in the star-barbell topology may act as a "first node" to generate connection confidence prediction ($pred_j$) for each connection with a "second node" (PEER-j) for j=1, . . . , L and L=22. The connection confidence prediction may be generated based on (nid, nav) as well as ($pnid_j$, $pnav_j$) associated with each peer, such as using AI engine(s) explained using FIGS. 3-5. Based on the connection confidence prediction, each "first node" may decide to break or maintain a connection with a neighbor node (i.e., with direct connection).

Based on connection confidence predictions at different time points, node 1 may break a connection with node 8 (see 650), maintain connection with node 7 (see 651) and form new connections with respective nodes 3 and 16 (see 652-653). In another example, node 15 may break a connection with node 20 (see 660), maintain connection with node 21 (see 661), and form new connection with node 23 (see 662). Other nodes may generate connection confidence predictions to break, maintain, and form connections in a similar manner (see crosses and dotted lines). Note that the example in FIG. 6 may be one of hundreds of possible adaptations of the network topology at one point in time.

Using examples of the present disclosure, the number of hops required to propagate data from source node=1 to target node=15 may be reduced from 11 to 3 (see 670 in FIG. 6). This has the effect of incentivizing nodes to connect more widely and reducing the network diameter of the original star-barbell topology with two clusters. Having a reduced network diameter increases the efficiency associated with spread of data and improves network performance.

In one experiment, the following parameters may be configured for the star-barbell topology in FIG. 6, such as epochs per node=1500, learning rate=0.01 for stochastic gradient descent performed using (nid, nav) and NN2N ratio=3. As the dimension of (nid, nav) is increased (e.g., N increases from 3 to 13) while keeping parameters constant, it is observed that there is an increase in recall and accuracy at each node. This indicates that examples of the present disclosure may be implemented to train AI engine(s) to predict neighbor connection strength.

Experimental Evaluations

Example experimental evaluations will be discussed using FIGS. 7A-C. Here, FIG. 7A is a diagram illustrating a first example experimental evaluation of decentralized network topology adaptation in a P2P network with 40 nodes, FIG. 7B is a diagram illustrating a second example experimental evaluation of decentralized network topology adaptation in a P2P network with 120 nodes, and FIG. 7C is graph illustrating an example network topology contraction in a P2P network with 75 nodes in three clusters.

Figures 7A, 7B, 7C:
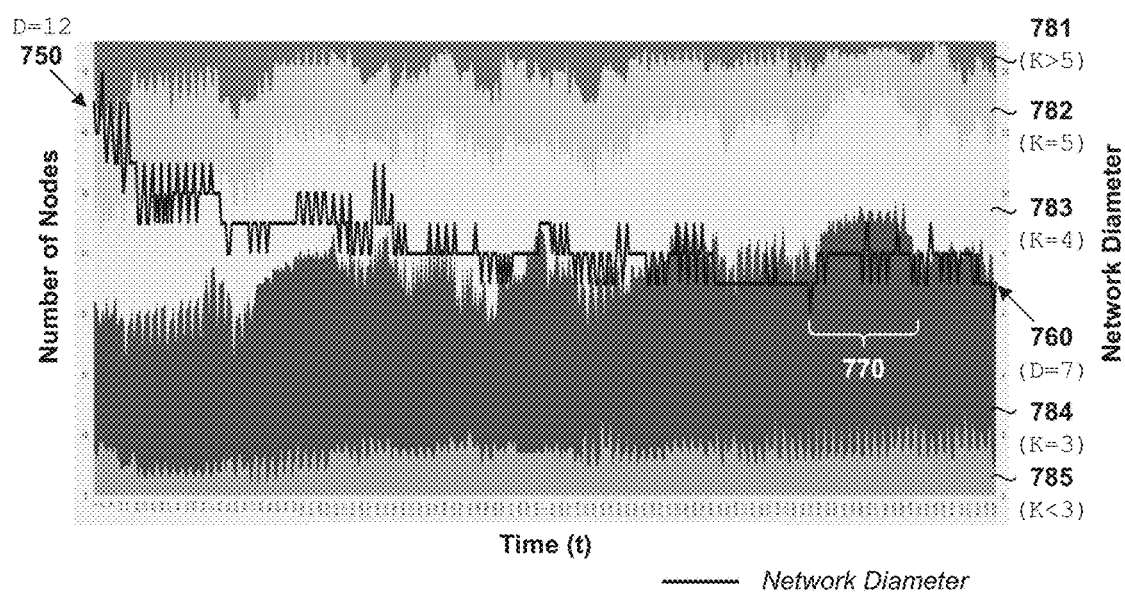
FIG. 7A is a diagram illustrating a first example experimental evaluation of decentralized network topology adaptation in a P2P network with 40 nodes.
FIG. 7B is a diagram illustrating a second example experimental evaluation of decentralized network topology adaptation in a P2P network with 120 nodes.
FIG. 7C is graph illustrating an example network topology contraction in a P2P network with 75 nodes in three clusters.
Figure 8:
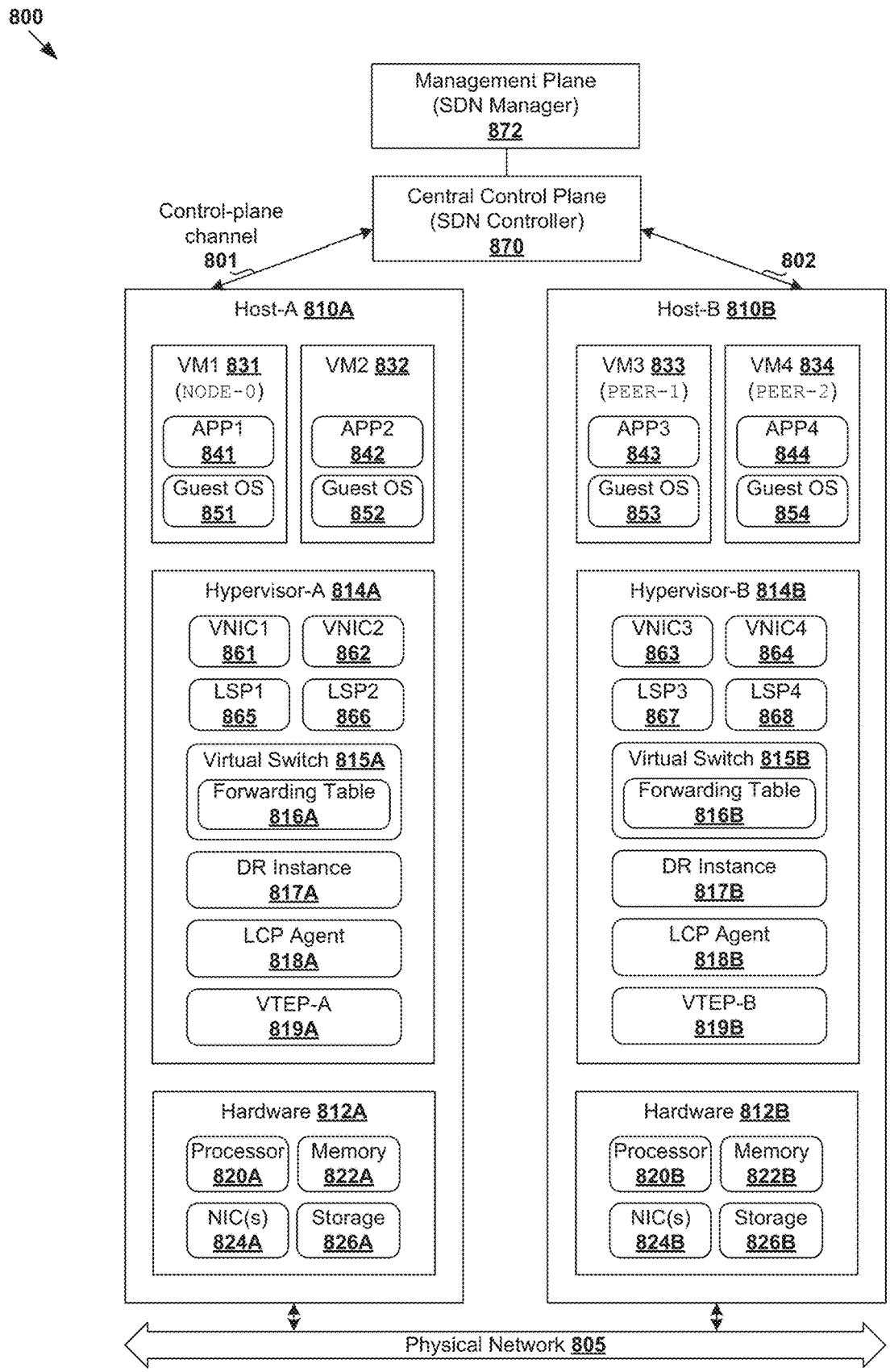
FIG. 8 is a schematic diagram illustrating an example software-defined networking (SDN) environment supporting nodes in a P2P network.

In the example in FIG. 7A, consider an example P2P network topology with 40 nodes and a pseudo degree graph with K as required degree, which indicates the number of connections a node has established. Here, D=diameter of a generated graph representing the P2P network topology, CBT=number of connections below threshold where connection confidence threshold is to set 0.8, CAT=number of connections above threshold (i.e., break condition satisfied), MCBT=mean connection confidence prediction of CBT, MCAT=mean connection confidence prediction of CAT, MCC=mean connection confidence with respect to all connections.

Any suitable hyperparameters may be configured, such as learning rate=0.009, epochs per node=15000, dimension of node attribute information=11 and NN2N=4. It is noted that the number of nodes remains the same (i.e., 40 nodes) as the degree increases from 3 to 10, in which case every node is connected to 1 out of 4 nodes. Based on FIG. 7A, it is observed that as the degree (K) increases and network diameter (D) shrinks, the value of MCBT decreases (e.g., from 0.750 to 0.434) and the value of MCAT increases (e.g., from 0.854 to 0.886). See 710-720 in FIG. 7A.

Results 710-720 in FIG. 7A may be explained as follows. As the graph representing the P2P network becomes denser (i.e., more connected or wider the reach is), it may be more difficult to predict connection strength (e.g., provided embedding vector's dimensions are of reasonable size). Ideally, nodes should not be able to differentiate between neighbor(s) and non-neighbor(s) even when there is an attempt to overfit data at very large epochs. As such, as the diameter decreases, it may become harder to train to generate predictions with enough confidence.

Further, as the diameter decreases (e.g., due to increase in degree), the mean connection confidence for connection below threshold starts to decrease substantially rapidly with an increase in the number of connections below threshold (note percentage wise "CBT %"). Meanwhile, the connection above threshold starts increasing in strength with decrease in the number of connections above threshold (note percentage wise "CAT %"). One hypothesis is that nodes may pick up few neighbors and start training in such fashion that they are connected to them strongly, whereas few else are forsaken depending on the structural connectivity and path of least resistance when training starts and also how random values are initialized. Note that the experiment may be repeated with different structural connection and at a different scale to study behavioral anomalies (if any) in more detail.

In the example in FIG. 7B, the number of nodes is increased from 40 to 120. Compared to FIG. 7A, the degree is increased from 5 to 10 while other parameters are unchanged. Similar results may be observed albeit with a smaller delta change. In particular, as the degree is increased and network diameter shrinks, the value of MCBT decreases (e.g., from 0.485 to 0.210) and the value of MCAT increases (e.g., from 0.833 to 0.863). See 730-740 in FIG. 7B.

In a controlled simulation, an experiment may be performed where after every 200 epochs, for example, network topology adaptation is performed to generate connection confidence predictions and to break suboptimal connections that satisfy a break condition (e.g., threshold=0.8). New connections are also formed to maintain the degree of node(s), such as when new nodes are available for forming connections. At the end of 25000 epochs, it is observed that there is a decline in diameter from 10 to 8 for a graph where the maximum allowed degree was 3 with 80 nodes.

In practice, individual nodes generally have fixed lower and upper bounds on the number of neighbors. Decentralized network topology adaptation may result in formation of new connections as more easily predicted ones (i.e., break condition satisfied) are broken. This continues until the network topology becomes substantially dense enough that nodes are unable to generate connection confidence predictions that are above a predetermined threshold. However, since there is an upper bound on the number of connections per node, one way to make the network topology denser is to force or incentivize each node to connect more widely. This has the effect of reducing the likelihood of cluster formation in a P2P network as a side effect that leads to shrinking of network diameter.

For an AI engine to learn something, there needs to be a valid substructure (since randomness cannot be learned). As such, if nodes are able to predict existing connection with strong sense of belief (i.e. high connection confidence), there may be an indication that either (1) the nodes are able to learn the underlying substructure (i.e., it is strongly connected by multiple paths or both nodes are in same cluster/community) or (2) embeddings ended up such that it favored the connection (not learning, just coincidence). Results of experimental evaluations support the hypothesis that (1) the underlying substructure may be learned because learnable substructure exists, and more easily predictable connections may be identified and terminated.

In the example in FIG. 7C, consider an example P2P network topology with three bootstrap servers and three clusters of 25 nodes/agents per cluster (i.e., 75 nodes). Each node is connected to one of the bootstrap servers and configured with a lower bound of three neighbors and an upper bound of five neighbors. Each node may accept a maximum of seven connections before they start blocking peers (i.e., 35% buffer with respect to upper bound). Over time, excess connection may be broken (e.g., randomly) until the number of connections is equal to the upper bound. Extra buffer connection may be required to avoid disconnected groups of small clusters with all nodes reaching upper bound in connected neighbors which is formed due to rapid generation of cluster nodes.

Initially, the three clusters are not aware of each other's existence, and mapped to different Hilbert spaces. After a certain amount of time has passed with each network breaking bonds and forming new ones in their own locality, a connection is formed between two nodes located in the respective first and second clusters. Similarly, a connection is formed between two nodes located in the respective second and third clusters. After connecting the clusters, all nodes belong to a single large network of 75 nodes where three clusters were connected to each other by two connection edges.

Using examples of the present disclosure, network diameter in the example in FIG. 7C shrinks from an initial diameter of 12 (see 750) and finally saturates at 7 (see 760). Each node does not try to dial up new peers until the number of connections falls below a lower bound, as the majority of nodes start stabilizing and start breaking connection from upper bound to lower due to increase in the value of connection confidence prediction. It is observed that fluctuations in diameter may occur due to various reasons. A first reason may be nodes connecting with wider reach may lower the network diameter. A second reason may be the number of connections per node dropping from upper to lower bound due to nodes breaking connection(s), which may increase the diameter. See fluctuations during time= [349, 393] at 770 in FIG. 7C.

FIG. 7C also shows fluctuations in the number of nodes associated different values of degree (K). The fluctuations of why node might be moving from degree lower bound (K=3; see 784) to upper bound (K=5; see 782) are because there might be a case where neighbors of a node might break connection with it simultaneously (i.e., the node will exists in state labelled K<3; see 785), or it is breaking connection (i.e., K=3 to K=5; see 782-784), or it might connect to more than 5 nodes when a couple of nodes who are looking for neighbors connect to it at the same time (i.e., K>5; see 781). See 781-785 in FIG. 7C. Note that fewer fluctuations may be observed as data in FIG. 7C is spread across larger time scale.

Discussions (a) Security Issues

When attribute information associated with a node is exposed to a P2P network, malicious nodes may keep changing attribute information in an adversarial fashion such that it is harder for non-malicious nodes to generate connection confidence predictions. In this case, malicious nodes may take advantage of this weakness to segment nodes from the P2P network to launch a malicious attack, such as a targeted sybil attack. Almost all P2P networks are susceptible to such attacks due to nodes broadcasting their node identity and activation vectors in structured P2P networks. Examples of the present disclosure do not make it easier for malicious nodes to execute sybil attacks compared to any existing P2P network.

Malicious nodes may affect a victim's attribute information by feeding adversarial non-neighbor's attribute information during training. When consumed, the identity and activation vectors may be updated for worse but the bigger the non-neighbor's attribute peer store from where attribute information is picked at random for training, the harder it is to influence training. However, once connected to malicious nodes, its attribute information may be consumed during the node identity vector averaging phase, where the $pnid_j$ of neighbor nodes are averaged to influence a node's nid at a factor of a user-defined LID. The Impact of this attack over a node's nid may be handled by increasing the range of connection's bound, i.e. minimum number of neighbor nodes that are connected to a node (e.g., at all times) and minimizing the LID hyperparameter (see 561 in FIG. 5) to reduce the direct influence of neighbor nodes over a node's attribute information.

Using examples of the present disclosure, malicious nodes are unable to change attribute information of other nodes directly because good, non-malicious nodes may sign their temporal updates using their private key. Although malicious nodes may keep on changing their own attribute information in hope of being connected indefinitely, all connections in the P2P network have a timeout associated with them to prevent such a scenario. At the end, malicious nodes may use attribute information in an adversarial way to degrade the performance of decentralized network topology adaptation according to examples of the present disclosure. Any suitable prevention and defense mechanisms against sybil attacks may be implemented in practice.

(b) Scalability

Examples of the present disclosure may be implemented by multiple nodes in a P2P network in a decentralized manner (i.e., without a central authority). As such, the performance of the examples of the present disclosure is generally not dependent on the number of nodes that exist in the P2P network. Each node may configure a maximum number of second (peer) nodes whose second attribute information is stored in its peerstore.

(c) Comparison with Random Strategy

Examples of the present disclosure should be contrasted against conventional approaches for breaking connections and connecting to peer nodes randomly. In particular, compared to a random approach, decentralized network topology adaptation according to examples of the present disclosure may be implemented to achieve a denser state by identifying and breaking suboptimal connections. Once such a state is achieved, examples of the present disclosure may be implemented to continue learning the network topology. In this case, as nodes will no longer able to predict connections with enough confidence to exceed the threshold, the P2P network may achieve stability once a denser state is achieved.

Further, infusing true randomness using in a P2P network does not always translate to nodes connecting with peer nodes that will give them a wider reach. The random approach has the same probability of resulting in a state with a worse network topology structure. Examples of the present disclosure may be implemented to shrink network diameter by connecting with other nodes more widely, which is possible when it is able to identify and break substantially more predictable connections. Over time, the denser the network topology gets, it might become more difficult to predict connection confidence due to saturation at some dense state while the P2P network still has room to shrink or become denser.

Computer System(s)

Depending on the desired implementation, "first computer system" acting as a "first node" and "second computer system" acting as a "second node" in P2P network 100 may be implemented using VM(s), physical machine(s), or a combination of both. The case of virtual implementation will be explained using FIG. 8, which is a schematic diagram illustrating example software-defined networking (SDN) environment 800 supporting nodes in a P2P network. It should be understood that, depending on the desired implementation, SDN environment 800 may include additional and/or alternative components than that shown in FIG. 2. Here, SDN environment 800 may include any number of hosts, such as hosts 210A-B (also known as "computer systems," "computing devices", "host computers", "host devices", "physical servers", "server systems", "transport nodes," etc.).

Host 810A/810B may include suitable hardware 812A/812B and virtualization software (e.g., hypervisor-A 814A, hypervisor-B 814B) to support various VMs. For example, host-A 810A may support VM1 831 (e.g., NODE-0 110 in FIG. 1) and VM2 832, while VM3 833 (e.g., PEER-1 111 in FIG. 1) and VM4 834 (e.g., PEER-2 112 in FIG. 2) are supported by host-B 810B. Hardware 812A/812B includes suitable physical components, such as central processing unit(s) (CPU(s)) or processor(s) 820A/820B; memory 822A/822B; physical network interface controllers (PNICs) 824A/824B; and storage disk(s) 826A/826B, etc.

Hypervisor 814A/814B maintains a mapping between underlying hardware 812A/812B and virtual resources allocated to respective VMs. Virtual resources are allocated to respective VMs 831-834 to support a guest operating system (OS; not shown for simplicity) and application(s); see 841-844, 851-854. For example, the virtual resources may include virtual CPU, guest physical memory, virtual disk, virtual network interface controller (VNIC), etc. Hardware resources may be emulated using virtual machine monitors (VMMs). For example in FIG. 8, VNICs 861-864 are virtual network adapters for VMs 831-834, respectively, and are emulated by corresponding VMMs (not shown) instantiated by their respective hypervisor at respective host-A 810A and host-B 810B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 814A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-8" may refer generally to a link layer or media access control (MAC) layer; "layer-3" a network or Internet Protocol (IP) layer; and "layer-4" a transport layer (e.g., using TCP, User Datagram Protocol (UDP), etc.), in the Open System Interconnection (OSI) model, although the concepts described herein may be used with other networking models.

SDN controller 870 and SDN manager 872 are example network management entities in SDN environment 800. One example of an SDN controller is the NSX controller component of VMware NSX® (available from VMware, Inc.) that operates on a central control plane. SDN controller 870 may be a member of a controller cluster (not shown for simplicity) that is configurable using SDN manager 872. Network management entity 870/872 may be implemented using physical machine(s), VM(s), or both. To send or receive control information, a local control plane (LCP) agent (not shown) on host 810A/810B may interact with SDN controller 870 via control-plane channel 801/802.

Through virtualization of networking services in SDN environment 800, logical networks (also referred to as overlay networks or logical overlay networks) may be provisioned, changed, stored, deleted and restored programmatically without having to reconfigure the underlying physical hardware architecture. Hypervisor 814A/814B implements virtual switch 815A/815B and logical distributed router (DR) instance 817A/817B to handle egress packets from, and ingress packets to, VMs 831-834. In SDN environment 800, logical switches and logical DRs may be implemented in a distributed manner and can span multiple hosts.

For example, a logical switch (LS) may be deployed to provide logical layer-8 connectivity (i.e., an overlay network) to VMs 831-834. A logical switch may be implemented collectively by virtual switches 815A-B and represented internally using forwarding tables 816A-B at respective virtual switches 815A-B. Forwarding tables 816A-B may each include entries that collectively implement the respective logical switches. Further, logical DRs that provide logical layer-3 connectivity may be implemented collectively by DR instances 817A-B and represented internally using routing tables (not shown) at respective DR instances 817A-B. Each routing table may include entries that collectively implement the respective logical DRs.

Packets may be received from, or sent to, each VM via an associated logical port. For example, logical switch ports 865-868 (labelled "LSP1" to "LSP4") are associated with respective VMs 831-834. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 815A-B, whereas a "virtual switch" may refer generally to a software switch or software implementation of a physical switch. In practice, there is usually a one-to-one mapping between a logical port on a logical switch and a virtual port on virtual switch 815A/815B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual eXtensible Local Area Network (VXLAN), Stateless Transport Tunneling (STT), Generic Network Virtualization Encapsulation (GENEVE), Generic Routing Encapsulation (GRE), etc. For example, VXLAN is a layer-8 overlay scheme on a layer-3 network that uses tunnel encapsulation to extend layer-8 segments across multiple hosts which may reside on different layer 8 physical networks. Hypervisor 814A/814B may implement virtual tunnel endpoint (VTEP) 819A/819B to encapsulate and decapsulate packets with an outer header (also known as a tunnel header) identifying the relevant logical overlay network (e.g., VNI). Hosts 810A-B may maintain data-plane connectivity with each other via physical network 805 to facilitate east-west communication among VMs 831-834.

Although discussed using VMs 831-834, it should be understood that decentralized network topology adaptation may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 831, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to other instructions implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a first computer system to perform decentralized network topology adaptation in a peer-to-peer (P2P) network, the method comprising:
   obtaining first attribute information associated with the first computer system;
   obtaining second attribute information associated with a second computer system that is connected with the first computer system in the P2P network, wherein the second attribute information specifies an egocentric representation, associated with the second computer system, of how the second computer system interacts with identity representations of other nodes in the P2P network;
   based on the first attribute information and the second attribute information, generating a connection confidence prediction associated with a connection between the first computer system and the second computer system, wherein the connection confidence prediction indicates whether the connection is a suboptimal connection associated with a suboptimal network topology in the P2P network;
   determining whether the connection confidence prediction satisfies a break condition that is configured to detect the suboptimal connection; and
   in response to determination that the connection confidence prediction satisfies the break condition, breaking the connection between the first computer system and the second computer system, but otherwise maintaining the connection.

2. The method of claim 1, wherein generating the connection confidence prediction comprises:
   generating the connection confidence prediction associated with a connection strength of the connection between the first computer system and the second computer system.

3. The method of claim 2, wherein breaking the connection comprises:
   in response to determination that the connection strength satisfies the break condition, (a) breaking the connection with the second computer system, and (b) forming a new connection with a non-neighbor computer system to facilitate contraction of the suboptimal network topology having a substantially large network diameter.

4. The method of claim 1, wherein obtaining the first attribute information comprises:
   obtaining the first attribute information that includes at least one of: (a) a node identity vector specifying an identity representation associated with the first computer system; and (b) a node activation vector specifying an egocentric representation associated with the first computer system, wherein the egocentric representation associated with the first computer system represents how the first attribute information interacts with the second attribute information.

5. The method of claim 4, wherein generating the connection confidence prediction comprises:
   generating the connection confidence prediction using (a) the first attribute information that includes the node identity vector, and (b) the second attribute information that includes a peer node activation vector specifying the egocentric representation associated with the second computer system.

6. The method of claim 4, wherein the second attribute information further specifies an identity representation associated with the second computer system, and wherein generating the connection confidence prediction comprises:
   generating the connection confidence prediction using (a) the first attribute information that includes the node activation vector, and (b) the second attribute information that includes a peer node identity vector specifying the identity representation associated with the second computer system.

7. The method of claim 1, wherein generating the connection confidence prediction comprises:
   generating the connection confidence prediction using (a) the first attribute information as weight, and (b) the second attribute information as input to an artificial intelligence (AI) engine.

8. A method for a first computer system to perform decentralized network topology adaptation in a peer-to-peer (P2P) network, the method comprising:
   obtaining first attribute information associated with the first computer system;
   obtaining second attribute information associated with a second computer system that is connected with the first computer system in the P2P network, wherein the second attribute information specifies an egocentric representation, associated with the second computer system, of how the second computer system interacts with identity representations of other nodes in the P2P network;
   training an artificial intelligence (AI) engine using the first attribute information and the second attribute information to generate a connection confidence prediction associated with a connection between the first computer system and the second computer system, wherein the connection confidence prediction indicates whether the connection is a suboptimal connection associated with a suboptimal network topology in the P2P network; and
   in response to determination that the connection confidence prediction satisfies the break condition, breaking the connection between the first computer system and the second computer system, but otherwise maintaining the connection.

9. The method of claim 8, wherein training the AI engine comprises:
training the AI engine using (a) the first attribute information as weight and (b) the second attribute information as input to generate the connection confidence prediction in a form of a connection strength between the first computer system and the second computer system.

10. The method of claim 8, wherein training the AI engine comprises:
training the AI engine using (a) the first attribute information that includes a node identity vector specifying an identity representation associated with the first computer system, and (b) the second attribute information that includes a peer node activation vector specifying the egocentric representation associated with the second computer system.

11. The method of claim 10, wherein training the AI engine comprises:
updating the node identity vector based on a loss function that includes: (a) a mean squared error between the connection confidence prediction and an expected prediction indicating whether the second computer system is a neighbor or non-neighbor; and (b) a dissimilarity component.

12. The method of claim 8, wherein the second attribute information further specifies an identity representation associated with the second computer system, and wherein training the AI engine comprises:
training the AI engine using (a) the first attribute information that includes a node activation vector specifying an egocentric representation associated with the first computer system, and (b) the second attribute information that includes a peer node identity vector specifying the identity representation associated with the second computer system.

13. The method of claim 12, wherein training the AI engine comprises:
updating the node activation vector based on a loss function that includes a mean squared error between the connection confidence prediction and an expected prediction indicating whether the second computer system is a neighbor or non-neighbor.

14. The method of claim 10, wherein training the AI engine is based on at least one of:
a first hyperparameter in a form of a non-neighbor-to-neighbor (NN2N) ratio specifying a minimum number of non-neighbors relative to neighbors to reduce or remove sampling bias; and
a second hyperparameter in a form of a local identity damper (LID) to update a node identity vector associated with the first computer system based on multiple peer node identity vectors associated with respective multiple second computer systems.

15. A computer system capable of acting as a first computer system in a peer-to-peer (P2P) network, the computer system comprising:
a processor; and
a non-transitory computer-readable medium having stored thereon instructions that, in response to execution by the processor, cause the processor to:
obtain first attribute information associated with the first computer system;
obtain second attribute information associated with a second computer system that is connected with the first computer system in the P2P network, wherein the second attribute information specifies an egocentric representation, associated with the second computer system, of how the second computer system interacts with identity representations of other nodes in the P2P network;
based on the first attribute information and the second attribute information, generate a connection confidence prediction associated with a connection between the first computer system and the second computer system, wherein the connection confidence prediction indicates whether the connection is a suboptimal connection associated with a suboptimal network topology in the P2P network;
determine whether the connection confidence prediction satisfies a break condition that is configured to detect the suboptimal connection; and
in response to determination that the connection confidence prediction satisfies the break condition, break the connection between the first computer system and the second computer system, but otherwise maintain the connection.

16. The computer system of claim 15, wherein the instructions that cause the processor to generate the connection confidence prediction cause the processor to:
generate the connection confidence prediction associated with a connection strength of the connection between the first computer system and the second computer system.

17. The computer system of claim 16, wherein the instructions that cause the processor to break the connection cause the processor to:
in response to determination that the connection strength satisfies the break condition, (a) break the connection with the second computer system, and (b) form a new connection with a non-neighbor computer system to facilitate contraction of the suboptimal network topology having a substantially large network diameter.

18. The computer system of claim 15, wherein the instructions that cause the processor to obtain the first attribute information cause the processor to:
obtain the first attribute information that includes at least one of: (a) a node identity vector specifying an identity representation associated with the first computer system; and (b) a node activation vector specifying an egocentric representation associated with the first computer system, wherein the egocentric representation associated with the first computer system represents how the first attribute information interacts with the second attribute information.

19. The computer system of claim 18, wherein the instructions that cause the processor to generate the connection confidence prediction cause the processor to:
generate the connection confidence prediction using (a) the first attribute information that includes the node identity vector, and (b) the second attribute information that includes a peer node activation vector specifying the egocentric representation associated with the second computer system.

20. The computer system of claim 18, wherein the second attribute information further specifies an identity representation associated with the second computer system, and wherein the instructions that cause the processor to generate the connection confidence prediction cause the processor to:
generate the connection confidence prediction using (a) the first attribute information that includes the node activation vector, and (b) the second attribute information that includes a peer node identity vector specifying the identity representation associated with the second computer system.

21. The computer system of claim 15, wherein the instructions that cause the processor to generate the connection confidence prediction cause the processor to:
generate the connection confidence prediction using (a) the first attribute information as weight, and (b) the second attribute information as input to an artificial intelligence (AI) engine.

* * * * *